May 24, 1938.  G. A. LYON  2,118,615
ORNAMENTAL FENDER SKIRT
Filed Oct. 7, 1936  3 Sheets-Sheet 1
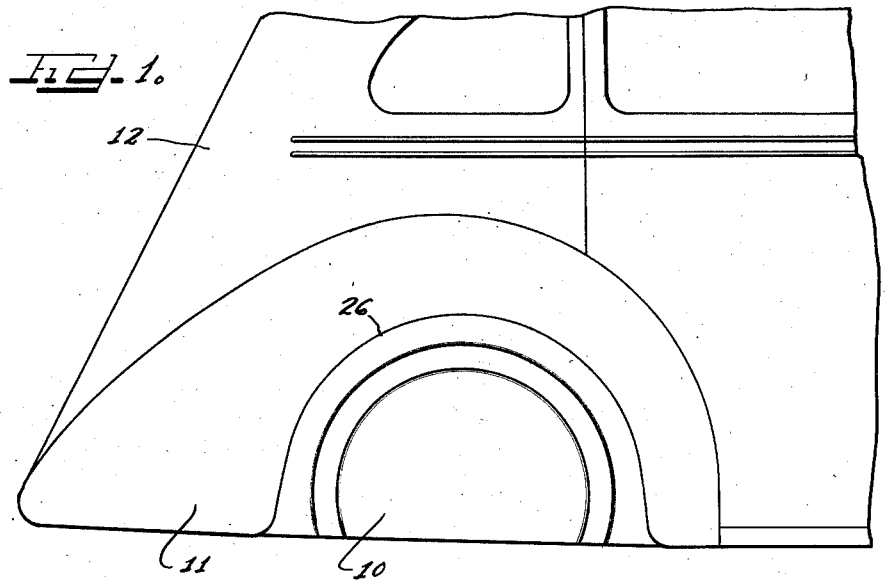
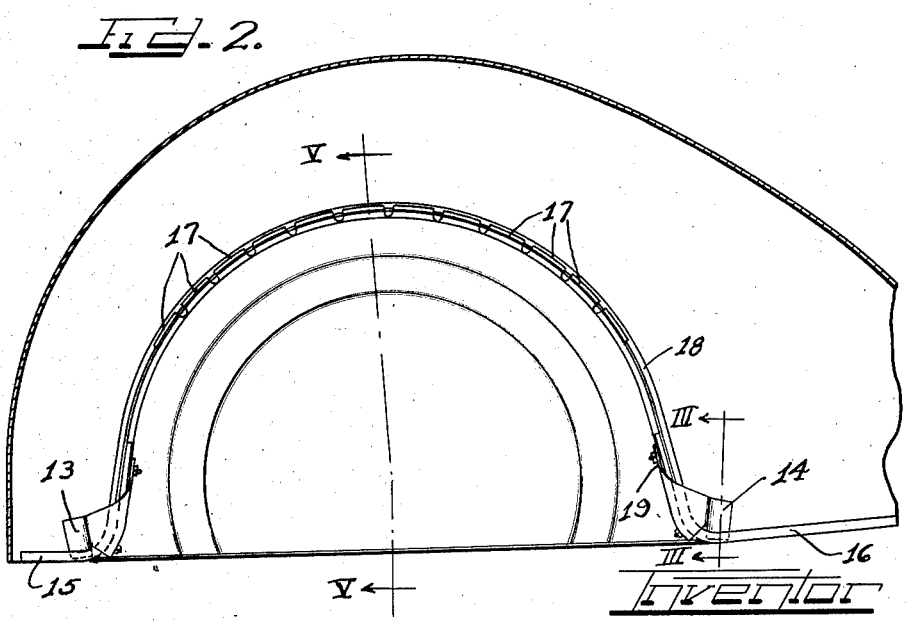
George Albert Lyon.

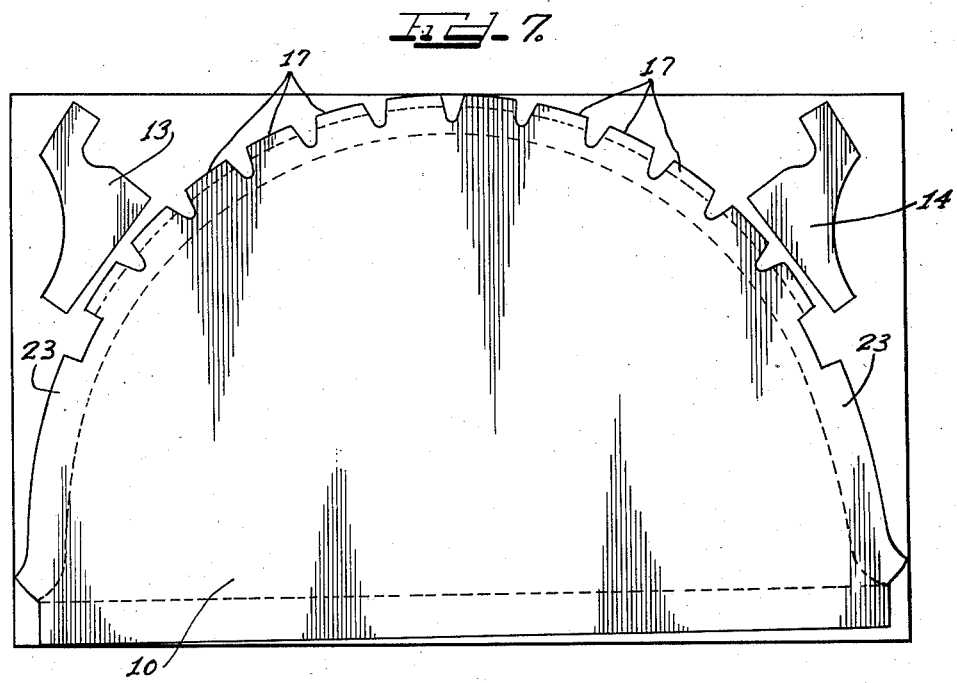
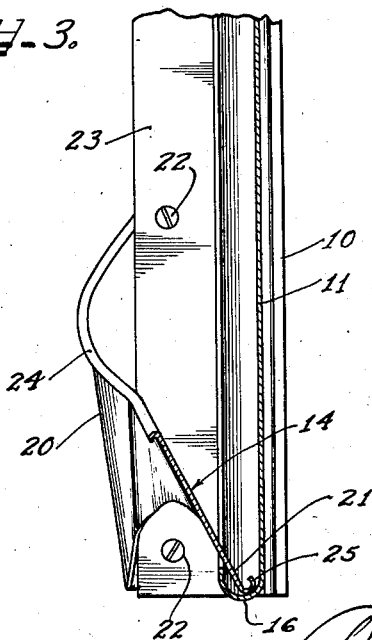

May 24, 1938.     G. A. LYON     2,118,615
ORNAMENTAL FENDER SKIRT
Filed Oct. 7, 1936     3 Sheets-Sheet 3
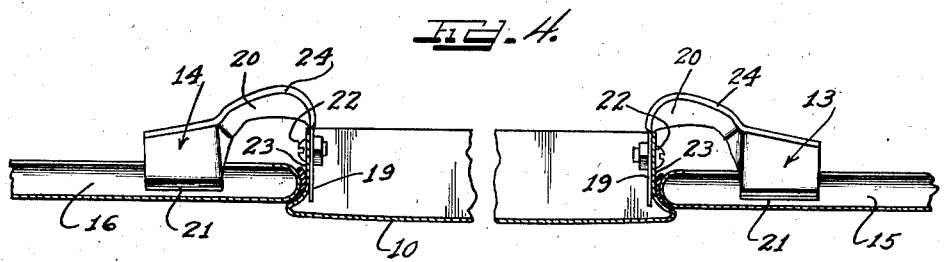
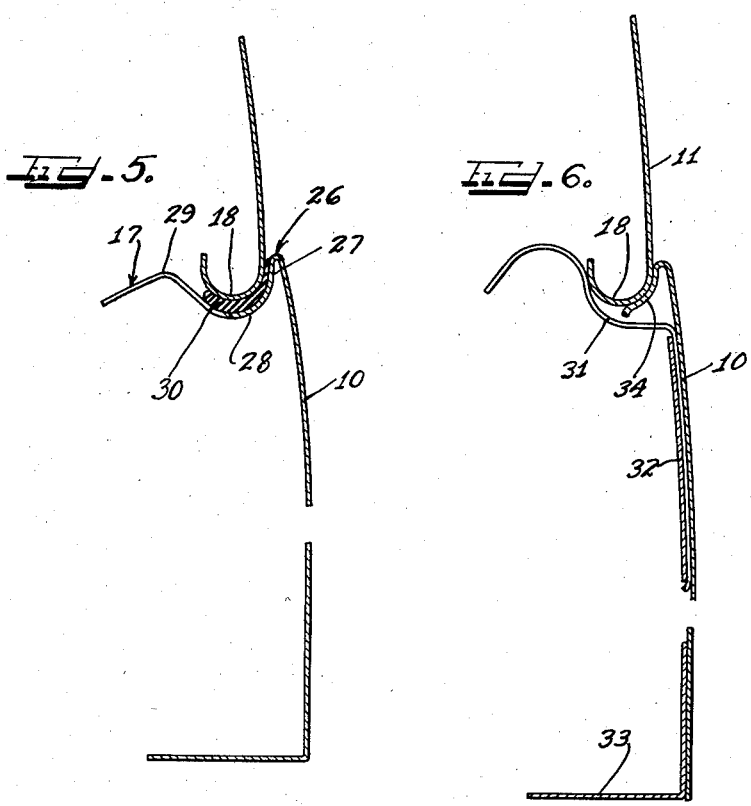
Inventor
GEORGE ALBERT LYON.
by Charles O'Niell Attys.

Patented May 24, 1938

2,118,615

UNITED STATES PATENT OFFICE 2,118,615

ORNAMENTAL FENDER SKIRT

George Albert Lyon, Allenhurst, N. J., assignor to Lyon Incorporated, Detroit, Mich., a corporation of Delaware Application October 7, 1936, Serial No. 104,376

5 Claims. (Cl. 280—153)

This invention relates to ornamental fender skirts, and more particularly to a novel means for securing an ornamental fender skirt in desired position on a vehicle fender.

In designing ornamental fender skirts or shields of the type which are adapted to cover the usual wheel access opening in a vehicle fender, it is important that the means which is employed to secure the fender skirt in desired position be simple and quick to operate both in assembling the skirt on the vehicle fender and in removing it therefrom. It must also possess the desired degree of ruggedness when in use and be substantially free from vibration and noise.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel trunnion supported snap-on ornamental fender skirt, the trunnion and snap-on means of which are formed from the same sheet of material from which the fender skirt itself is made.

Another object of this invention is to provide a novel ornamental fender skirt having trunnion members thereon which are formed of sheet material.

Another object of this invention is to provide a novel ornamental fender skirt having a novel form of supporting means thereon.

The novel features which I believe to be characteristic of my invention are set forth with particularity in the appended claims. My invention itself, however, both as to its organization and the manner of construction, together with further objects and advantages thereof, may best be understood by reference to the following description, taken in connection with the accompanying drawings, in which:

Figures 1 is a side elevational view of the rear part of an automobile having the usual form of vehicle fender and one embodiment of my novel ornamental fender skirt mounted thereon;

Figure 2 is a side elevational view, partly in cross section, of a vehicle fender and an ornamental fender skirt of the type illustrated in Figure 1, as viewed from the interior of the automobile body looking outwardly;

Figure 3 is an enlarged fragmentary view, partly in cross section, illustrating the novel form of supporting means which is employed on the ornamental fender skirt illustrated in Figures 1 and 2 of the drawings;

Figure 4 is an enlarged fragmentary plan view, partly in cross section, illustrating the ornamental fender skirt supporting members and the manner in which they engage the underturned marginal edges of a vehicle fender;

Figure 5 is a cross sectional end view taken along the line V—V of Figure 2, illustrating the snap-on means for retaining the ornamental fender skirt in desired position on a vehicle fender;

Figure 6 is an end view, partly in cross section, similar to Figure 5 but showing a slightly modified form of ornamental fender skirt retaining means; and Figure 7 illustrates a sheet of material from which the ornamental fender skirt and fender skirt supporting means may be stamped.

In Figures 1 and 2 of the drawings, an ornamental fender skirt 10 of the trunnion supported snap-on type is shown mounted on a vehicle fender 11 of an automobile 12. The particular means for supporting fender skirt 10 on fender 11 and for retaining it in its desired position includes a pair of trunnion members 13 and 14 which are adapted to engage the underturned marginal edges 15 and 16 of fender 11, and a plurality of spring fingers 17 which are adapted to engage the underturned marginal edge 18 of fender 11. In its broad aspects, this type of mounting means is described and claimed in my copending application for an "Ornamental fender skirt", filed August 29, 1936, Serial No. 98,441.

In Figures 3 and 4 of the drawings, I have illustrated in detail the particular type of supporting means which is employed on the fender skirt 10 of Figures 1 and 2 and which forms one of the cardinal features of the present invention.

Each trunnion member 13 and 14 is formed with a flat tail portion 19, an intermediate curved portion 20, and a free end or fender engaging portion 21. Flat tail portion 19 is secured by bolts or rivets 22 (or in any other suitable manner) to the inturned edge 23 of fender skirt 10. The upper edge of each trunnion member 13 and 14 is rolled as at 24 to give greater rigidity to the member. The free end 21 is rolled as at 25 about an axis substantially parallel to the plane of the fender skirt 10 to provide a suitable bearing surface for rocking fender skirt 10 into desired position on fender 11.

From the above description, it will be apparent that trunnion members 13 and 14 because of their peculiar hook-shaped formation are adapted to extend into engagement with underturned marginal edges 15 and 16 respectively of fender 11, thereby to vertically support fender skirt 10 on fender 11. Forming the trunnion members of sheet material greatly reduces the manufacturing costs of the article without detracting from the inherent ruggedness and reliability of the article.

The preferred means for restraining rotational movement of fender skirt 10 about its trunnion members 13 and 14 when fender skirt 10 is mounted on fender 11 is shown in Figures 2 and 5 of the drawings. More particularly, a plurality of integral fingers 17 are formed along a portion of the fender engaging edge 26 of fender skirt 10. It will be observed, after a close inspection of Figure 5, that the marginal edge 26 is first bent on itself as at 27 and then into a partial channel formation as at 28, the latter portion being adapted to lie in close proximity to underturned edge 18 of fender 11. Fingers 17 are preferably formed by serrating the outer edge of edge portion 26 and then bending the serrated portions to include hump-shaped portions 29 near their free ends. Portions 29 are thus adapted to cam fingers 27 under the underturned edge 18 of fender 11 and thereafter resiliently hold fender skirt 10 in tight cooperation with fender 11.

In order to eliminate substantially any rattling or noise caused by a metal to metal contact, a rubber strip 30 is disposed in the partial channel portion 28 of fender skirt 10. Strip 30 may be secured to channel 28 in any suitable manner (not shown) such as by cementing it thereto, or by clamping or bolting the opposite ends of strip 30 to channel 28.

From the above description, it will readily be understood that fender skirt 10 may be mounted on vehicle fender 11 by inserting trunnion members 13 and 14 in underturned edges 15 and 16 of fender 11 and then rocking fender skirt 10 about the trunnion members into desired position. As the fender engaging edge portion 26 rocks into position, fingers 17 are cammed under underturned edge portion 18 of fender 11. As the hump portions 29 of fingers 17 pass under the lowermost point of underturned edge 18, the inherent resiliency of fingers 17 will thereafter tend to restrain outward movement of fender skirt 10.

To dismount ornamental fender skirt 10 from fender 11, it is simply necessary to force the upper part of fender skirt 10 outwardly against the resilient action of fingers 17 until the hump portions 29 of fingers 17 are passed beneath the lowermost point of underturned edge 18 of fender 11. The fender skirt 10 may then be lifted out of engagement with underturned base edges 15 and 16 of fender 11, and the ornamental skirt is completely dismounted.

A slightly modified form of finger is illustrated at 31 in Figure 6 of the drawings. Fingers 31 in this modified form are made separate from fender skirt 10 and are secured to the latter by means of a bracket 32 or the like. Bracket 32 may be secured to fender skirt 10 in any suitable manner such as by welding or riveting. In this modified form the inturned base edge 33 of fender skirt 10 is also made of a separate piece which is thereafter welded or otherwise suitably secured to the lower marginal edge of fender skirt 10. In this particular modification, the rubber strip 30 has been omitted and the partial channel portion 34 of fender skirt 10 is shaped to intimately engage a portion of underturned edge 18 of fender 11.

The manner of mounting and dismounting the modified form of my ornamental fender skirt illustrated in Figure 6 of the drawings is similar in every respect to that above described in connection with the preferred embodiment of my invention.

In stamping out ornamental fender skirts 10 from a rectangular sheet of material, it has been found that the upper corners, which usually constitute waste, may be utilized for forming trunnion members 13 and 14 as is indicated in figure 7 of the drawings. This reduction in the amount of waste further reduces manufacturing costs, and thus greatly enhances the commercial desirability of this invention.

Trunnion members 13 and 14 are preferably stamped out during the stamping operation which forms ornamental fender skirt 10. The solid lines of Figure 7 indicate the lines along which the material is cut during the stamping operation, while the dotted lines indicate the lines along which the material is subsequently bent to form fender skirt 10.

From the above description, it will be apparent that I have provided an extraordinarily simple means for securing an ornamental fender skirt to a vehicle fender. Although the ornamental fender skirt has been described as employing a plurality of resilient fingers for retaining ornamental fender skirt in desired position on the vehicle fender, it is obvious that other means may be employed for preventing rotational movement of the fender skirt about its trunnion member, without departing from the spirit and scope of this invention. Furthermore, although the vehicle fender has been illustrated as being of the high crown type having underturned marginal edges, it is to be understood that the ornamental fender skirit may be employed with equal success with any type of fender having underturned marginal edges or the like.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender skirt having a pair of similarly shaped sheet metal hook-shaped trunnion members secured thereto at the lower corners thereof, said members being adapted to engage a vehicle fender to support said skirt, and means on said skirt remote from said members adapted to retain said skirt in desired position on said fender.

2. As an article of manufacture, an ornamental fender skirt having trunnion members thereon adapted to extend into supporting engagement with a vehicle fender, said members having their free ends rolled about an axis substantially parallel to the plane of said skirt forming a bead-like bearing surface, and means on said skirt adapted to retain said skirt in desired position on said fender.

3. As an article of manufacture, an ornamental fender skirt having trunnion members thereon, said members being adapted to extend into skirt supporting engagement with a vehicle fender and adapted to permit said skirt to be rocked into desired position on said fender, said members having their free ends rolled about the axis of rock of said skirt, and means on said skirt adapted to retain said skirt in desired position on said fender.

4. As an article of manufacture, an ornamental fender skirt having means thereon adapted to support said skirt on a vehicle fender, said means being adapted to permit angular movement of said skirt in a plane substantially perpendicular to the plane of the skirt, and means adapted to prevent angular movement of said skirt after said skirt is assembled on said fender, said first means including a pair of trunnion members formed of sheet material.

5. As an article of manufacture, an ornamental fender skirt having means thereon adapted to support said skirt on a vehicle fender, said means being adapted to permit angular movement of said skirt in a plane substantially perpendicular to the plane of the skirt, and means adapted to prevent angular movement of said skirt after said skirt is assembled on said fender, said first means including sheet metal trunnion members having their free end rolled about an axis substantially parallel to the plane of said skirt.

GEORGE ALBERT LYON.